A. JOHNSON.
SEWER FLOAT.
APPLICATION FILED SEPT. 1, 1915.
1,177,629.
Patented Apr. 4, 1916.
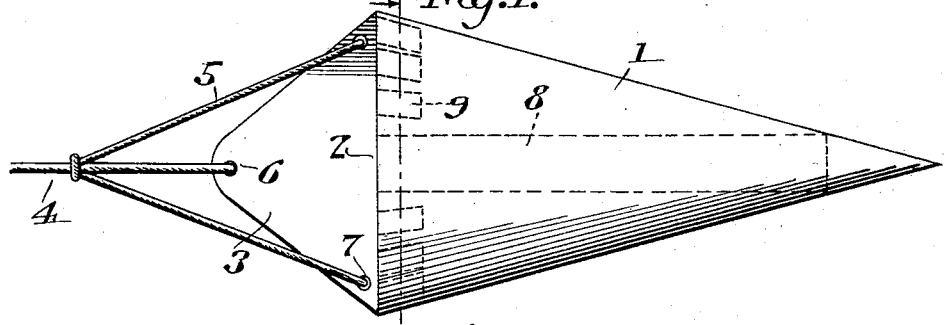
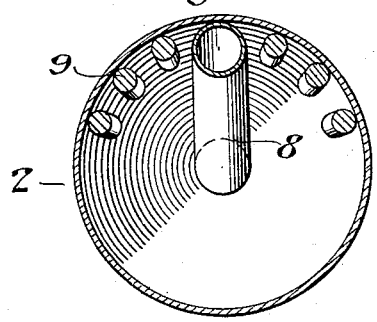
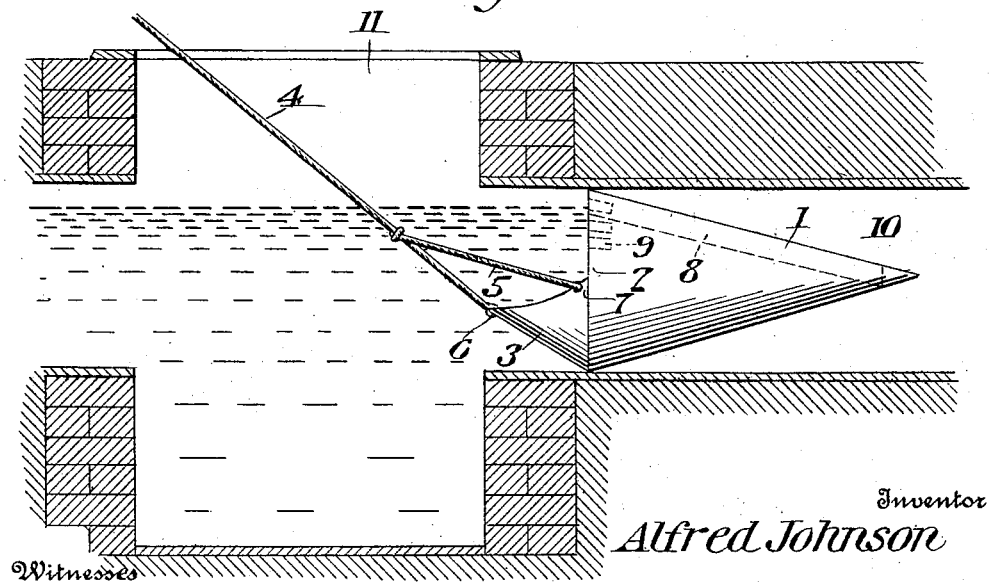
Inventor
Alfred Johnson
Witnesses
By Victor J. Evans
Attorney
THE COLUMBIA PLANOGRAPH CO., WASHINGTON, D. C.

UNITED STATES PATENT OFFICE.

ALFRED JOHNSON, OF TACOMA, WASHINGTON, ASSIGNOR OF ONE-HALF TO GEORGE H. KEYS, OF TACOMA, WASHINGTON.

SEWER-FLOAT.

1,177,629.      Specification of Letters Patent.      Patented Apr. 4, 1916.

Application filed September 1, 1915. Serial No. 48,499.

*To all whom it may concern:*

Be it known that I, ALFRED JOHNSON, a citizen of the United States, residing at Tacoma, in the county of Pierce and State of Washington, have invented new and useful Improvements in Sewer-Floats, of which the following is a specification.

This invention is an improved sewer float for use in cleaning sewers and the like, the object of the invention being to provide an improved device of this character which is cheap and simple in construction, which may be readily operated, and which may be used in a sewer of any size.

The invention consists in the construction, combination and arrangement of devices hereinafter described and claimed.

In the accompanying drawings:—Figure 1 is a plan of a sewer float constructed in accordance with my invention. Fig. 2 is a sectional view of the same on the plane indicated by the line *a—a* of Fig. 1. Fig. 3 is an elevation of the same as arranged for use in a sewer.

My improved sewer float has a conical body 1 which is made of suitable material such for instance a soft rubber cloth. At the larger, front end 2, the body is provided with an apron 3 on its lower side which extends forwardly therefrom and to which a hand line 4 is attached by means of divergent cords 5, the line being directly connected to the center of the apron as at 6 and the divergent cords 5 being connected to opposite sides of the apron as at 7. In the upper side of the apron is a longitudinally arranged rubber tube 8 which is airtight, and in the front of the body, in the upper side thereof, are corks or other suitable floats 9. A sewer 10 has the float forced through it by the flow of water, the float being introduced into the sewer through a manhole 11, and the hand line 4 enabling the float to be drawn back to remove the material from the sewer and to clean the same. Owing to its conical shape and the fact that the body of the float is made of flexible material, the float automatically adjusts itself, under the pressure of the water to the size of the sewer and hence the float may be used in sewers of varying sizes. The purpose of the airtight rubber pipe 8 is to act as a float to keep the axis of the body of the device level, the said pipe extending from end to end of the body as indicated.

Having thus described my invention, I claim:—

1. A sewer float of the class described comprising a conical body, open at the larger end, provided at said end with an apron, a hand line attached to said apron, and buoying means in the float.

2. A sewer float of the class described comprising a conical body, open at the larger end, provided at said end with an apron, a hand line attached to said apron, buoying means in the float, and said float being also provided in its upper side with a longitudinally arranged airtight pipe.

3. The herein described sewer float comprising a conical body of flexible material open at the front, larger end, provided at said end, on the lower side, with an apron, an airtight pipe of flexible material arranged longitudinally in the center of the upper side of the float, buoying means in the float and a hand line connected to the float.

In testimony whereof I affix my signature in presence of two witnesses.

ALFRED JOHNSON.

Witnesses:
    RALPH TEATS,
    F. E. ELLIOTT.

Copies of this patent may be obtained for five cents each, by addressing the "Commissioner of Patents, Washington, D. C."